United States Patent [19]

Compton

[11] Patent Number: 4,844,683
[45] Date of Patent: Jul. 4, 1989

[54] BULK ORCHARD HARVEST TRAILER WITH POWER ASSIST

[76] Inventor: Ira Compton, 2434 Dayton Rd., Chico, Calif. 95928

[21] Appl. No.: 220,626

[22] Filed: Jul. 18, 1988

[51] Int. Cl.$^4$ .............................................. B60P 1/36
[52] U.S. Cl. .................................. 414/520; 180/14.3; 280/408; 414/528; 414/679
[58] Field of Search ............... 414/519, 520, 528, 679, 414/293, 300, 327, 378, 376; 280/408; 180/14.3, 14.2; 105/282.1, 248; 298/27–37

[56] References Cited

U.S. PATENT DOCUMENTS

| | | | |
|---|---|---|---|
| 782,927 | 2/1905 | Saling | 105/248 |
| 926,724 | 7/1909 | Briggs | 298/30 |
| 1,025,359 | 5/1912 | Atkins | 298/30 |
| 1,073,837 | 9/1913 | Bartholomew | 298/30 |
| 1,353,062 | 9/1920 | Nelson | 298/35 R |
| 1,369,299 | 2/1921 | Peterson | 298/35 R |
| 2,190,724 | 2/1940 | McBride | 414/526 |
| 2,462,404 | 2/1949 | Kahres et al. | 414/519 |
| 2,589,988 | 3/1952 | Bruno | 414/520 X |
| 2,717,703 | 9/1955 | Kull et al. | 414/300 |
| 3,263,836 | 8/1966 | Kucera | 414/519 |
| 3,357,576 | 12/1967 | Strombeck et al. | 414/528 X |
| 3,874,470 | 4/1975 | Greene | 180/14.3 |
| 3,990,718 | 11/1976 | Holland | 280/408 |
| 4,095,705 | 6/1978 | Hood | 414/519 |
| 4,358,238 | 11/1982 | Ely | 280/408 X |
| 4,415,303 | 11/1983 | Westendorf et al. | 414/519 |

FOREIGN PATENT DOCUMENTS 815162 11/1951 Fed. Rep. of Germany ...... 414/520
489476 6/1978 U.S.S.R. ............................. 414/520

*Primary Examiner*—David A. Bucci

[57] ABSTRACT

The invention provides a low-profile agricultural trailer with power assisted wheels for use in orchards particularly during nut harvesting. A rectangular paneled trailer body has an open top partially covered by a sectional opened-top longitudinal hood, and is formed internally with hopper-like structure having sliding doors as openable bottom closures. The sliding doors move horizontally operated manually by levers at both ends of the trailer body. The hood has expanded metal see-through corners so nut loading can be watched and the nuts retained. A continuous loop load leveler has chains with angular load leveling paddles attached operational adjacently below the opened top of the hood. A base framework having trailer tow hitches at both ends supports the trailer body. An axle fastened to the base framework passes through a wheel housing downwardly opened transversely centrally through the trailer body. Two automotive type wheels with road tires are attached, one to each end of the axle by wheel hubs. A differential gear operational with the axle has a housed drive shaft affixed accessible protruding through a front panel on the trailer body. An attachable hydraulic motor can be used to supply power to the trailer wheels. Hydraulic lines are arranged to supply controlled fluid from an auxiliary source to operate a hydraulic motor running the load leveler and the wheel motor.

6 Claims, 4 Drawing Sheets

BULK ORCHARD HARVEST TRAILER WITH POWER ASSIST

BACKGROUND OF THE INVENTION

1. Field of the Invention

This invention relates to agricultural harvesting equipment in general and more specifically to large capacity pistachio harvest trailers having means for leveling the load and power assisted drive wheels.

2. Description of the Prior Art

Special trailers for transporting and unloading various agricultural products have been in use for many years. The need to move larger quantities of these products, especially nuts, at faster rates from the orchards to the processing plant has became a prime objective. For the farmer to stay competitive, he must have efficient and practical equipment tailored to his needs. A low-slung, large capacity trailer designed for orchard use equipped with bottom dump mechanics is almost a must for efficient harvesting of nuts. This is particularly true of pistachio nuts to accomplish timely harvesting of top quality products. The unique load leveling structure and self-propelling mechanics of the present invention provides the farmer with efficient equipment in a hauling and bottom dumping harvest trailer.

To ascertain past art in produce trailer development, a patent search was conducted at the U.S. Patent Office. The following issued patents show devices which to the best of my knowledge appear most pertinent to my invention:

1. On July 6, 1909, Briggs was issued U.S. Pat. No. 926,724 on a dumping wagon with chain operated swinging bottom doors.

2. U.S. Pat. No. 1,025,359, dated May 7, 1912, was granted to Atkins for a two door bottom dump wagon. The doors opened on either side of a wagon axle.

3. On Sept. 23, 1913, Bartholomew was granted U.S. Pat. No. 1,073,837, for a hopper dump wagon having crank operated double downward swinging doors.

4. Nelson was issued U.S. Pat. No. 1,353,062, dated Sept. 14, 1920, for a partitioned box bed with lever operated center dumping doors for vehicles. The doors swing downward from the center and are pulled back closed by chains.

5. U.S. Pat. No. 1,369,299, dated Feb. 22, 1921, was granted to Peterson for a dumping bed with pivoting bottom doors.

6. On Feb. 20, 1940, McBride was granted U.S. Pat. No. 2,190,724, for a loading device for railway cars designed to load the cars to a uniform capacity. Hopper type bottom dumping is shown in the McBride device.

A variety of trailers with hinged downward swinging doors showed up in the past art patents. Many are very old and mostly for use on wagons. Hinged doors were seen through out the search and some on modern hopper-type railroad gondola cars. Downward swinging dump door are difficult to close and there is no way to vary the flow rate once the load begins dropping. Considerable clearance must be provided between the bottom of a trailer having bottom-dump downwardly swinging doors or the doors cannot be closed unless the trailer is moved away from the dumped load or the load dumped into some type of receiving container. This ground clearance requirement sets the trailer or truck bed high and for orchard trailers, limits the capacity. Equipment designed for harvesting pistachios and other varieties of orchard grown nuts must be limited in height to provide clearance between the top of the trailer and the low overhanging branches of the trees in the orchard. Downward swinging dump doors require clearance which effects the maximum height nut trailer side walls can extend towards tree branches. This limits load space in nut harvest trailers. The length and width of pistachio hauling trailers is also restricted because the turning radii allowances for maneuvering between the trees of an orchard are strictly limited. Small harvest trailers become filled with nuts more often and require unloading with expensive frequency.

Existing nut harvesting trailers are pulled by accessary equipment such as large tractors or very specialized harvesting machines. Generally a harvesting machine is relied upon to provide power for propulsion in the orchard. Also, since the harvester is providing all the power, it must also provide all of the needed traction to pull the nut hauling trailer. Harvesters pulling trailers seldom have any problem as far as power is concerned. However, traction is a problem for the harvester trying to pull an almost full and very heavy harvest trailer in an orchard over sandy or plowed ground, especially if the soil is wet. In order to increase the carrying capacity of a pistachio harvest trailer, the traction problem must be solved. In my invention, I solve the traction problem by equipping the trailer with a self-powering means. My invention also solves the height and capacity problem by providing a low-slung, large capacity nut harvest trailer with sliding bottom dump doors. Neither a low-slung nut harvest trailer with sliding bottom dump doors nor a power assist or self-powered device for harvest trailer use was disclosed in the past art patents.

During nut harvesting, harvesting machines normally use equipment with conveyor belts for fast loading the crop off the harvester into the nut hauling trailer. The position of the conveyor belt in relation to the hauling trailer in tow is generally stationary. The nuts drop off the harvesting machine conveyor belt into the front of the hauling trailer and accumulate in a pile. Uneven disposition of nuts into the hauling trailer leaves unfilled space in the back of the trailer and can result in a pile of nuts higher than the top of the trailer side walls in the front. Although augers have been used in aggregate railroad cars (U.S. Pat. No. 2,190,724) and tried in trailers, augers in nut hauling trailers damage the nuts and are not very efficient. In my trailer, I provide a visual means for watching the load level and a mechanical means for leveling the load which does not damage nuts.

Another disadvantage of many presently used trailers and past art disclosed devices is that they are designed to be towed from only one end usually necessitating more turning around in the close confines of an orchard. When a nut hauling trailer becomes full, it is generally disconnected from the harvesting machine and removed by a large tractor and replaced with an empty trailer. Immediate trailer replacement allows continuous operation with the harvesting machine being shutdown as little as possible during the critical harvesting period. The advantage of my trailer over the one-way tow trailers now in use is that it can be towed from either end. No turning is required to remove my loaded trailer from the harvester and to replace it with another one of my trailers.

Therefore, my invention not only overcomes disadvantages found in devices disclosed in past art patents but it provides a new and improved bulk harvest nut trailer with large carrying capacity and unique mechanics not seen in nut orchard harvest trailers currently in use.

SUMMARY OF THE INVENTION

In practicing my invention I have provided a bulk harvest trailer specifically designed for collecting and hauling pistachios and similar nuts from the harvesting machine in the orchard to the processing plant.

The floor of the substantially rectangular trailer body forms two funnel-like hoppers. Each hopper has a bottom dump opening secured with double sectioned bottom dump slide doors. The doors retract horizontally in opposite directions releasing the load through the bottom of the trailer. Each slide door is positionable by one control lever per door. Two control levers are located on the front and two on the back of the trailer. Each of the four slide doors rides on four sections of wheel bearings for added support and reduced friction during opening and closing the doors. The door structure of my trailer permits the bottom to be close to the ground allowing higher side walls and greater load capacity in a low-profile trailer useful under the low branches of nut orchards.

One decided advantage provided in my trailer is self-propulsion. A drive shaft with a differential gear is attached to the axle of my trailer wheels. The drive shaft extends upward from the differential gear at an angle and terminates on the front exterior of the trailer in a hydraulic motor attachment spline shaft. The spline shaft is designed to be attached to an easily removed hydraulic motor. The hydraulic motor receives power through flexible hydraulic hoses pressurized by a hydraulic pump already present on most pistachio harvesting machines. The hydraulic motor drives the drive shaft, the differential gear, and the trailer wheels. With my trailer, the more weight in the trailer the less likely the harvester is to loose traction and become stuck. The weight of the load in my trailer gives it extremely good traction. In testing, my trailer has been shown to be able to push a harvester having a traction problem. The wide high-traction power assisted drive wheels of my bulk harvest trailer enable the load area to be designed to carry far more weight and volume than other trailers used for the same purpose.

Both the front and back ends of my trailer are affixed with tow hitches. Hitches on each end enable the trailer to be hitched to a large tractor before being unhitched from the harvester, eliminating the need for supporting a possibly unbalanced trailer. The double hitches also eliminate the need to turn the trailer around in the orchard in most cases. The double hitches are another feature which makes it possible for my trailer to carry extraordinarily heavy loads of nuts.

The top of my trailer is covered by a hood having angled solid side sections with see-through expanded metal corners and is longitudinally opened centrally. The upper covering hood allows the nuts to be piled higher by preventing overhanging branches from knocking the nuts off the trailer. The see-through corners lets the harvesting machine operator see the rate and manner in which the crop is being loaded. A load leveler is horizontally positioned lengthwise in the center of the hood opening. The load leveler is comprised of two parallel sections of chains cross suspending a plurality of right angle horizontally disposed interspersed drag or sweep paddles. The chains are moved hydraulically and the paddles sweep along leveling the nut load. This drag chain system angles downward into the front end of the trailer to an open section through which the nuts fall into off the harvesting machine. The drag chain is rotated while the trailer is being loaded redistributing and leveling the load. This insures making use of the trailer's maximum carrying capacity.

Therefore, it is a primary object of my invention to provide a low slung bulk harvest trailer for orchard use having the capacity to efficiently carry large quantities of nuts.

Another object of the invention is to provide a trailer with mechanics to use power from a nut harvesting machine to motivate the trailer wheels and help alleviate any harvester traction problem.

A further object of my invention is to provided a bulk harvest trailer having a bottom dump provided with horizontal sliding doors allowing for reduced ground clearance and higher side walls on the trailer.

An even further object of my invention is to provide a bulk harvest trailer structured to prevent partial load loss from branches brushing the trailer top.

A still further object of my invention is to provide a bulk harvest trailer for nuts with means for distributing the load evenly without damaging to the nuts.

Another object of my invention is to provide a bulk harvest trailer which can be towed from either the front or the rear end.

Other objects and the many advantages of my invention will become evident from reading the specification and comparing numbered parts described with similarly numbered parts illustrated in the accompanying drawings.

DESCRIPTION OF THE PREFERRED EMBODIMENT

Figure 1:
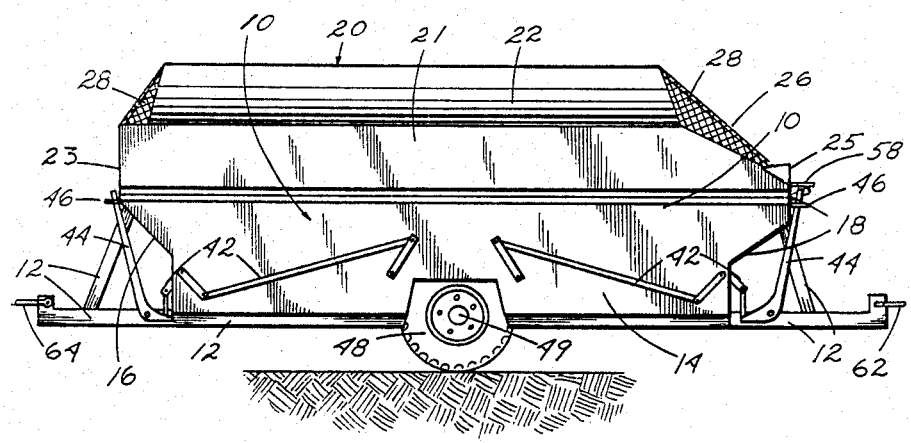
FIG. 1 is a right side view of my bulk harvest trailer.
Figure 4:
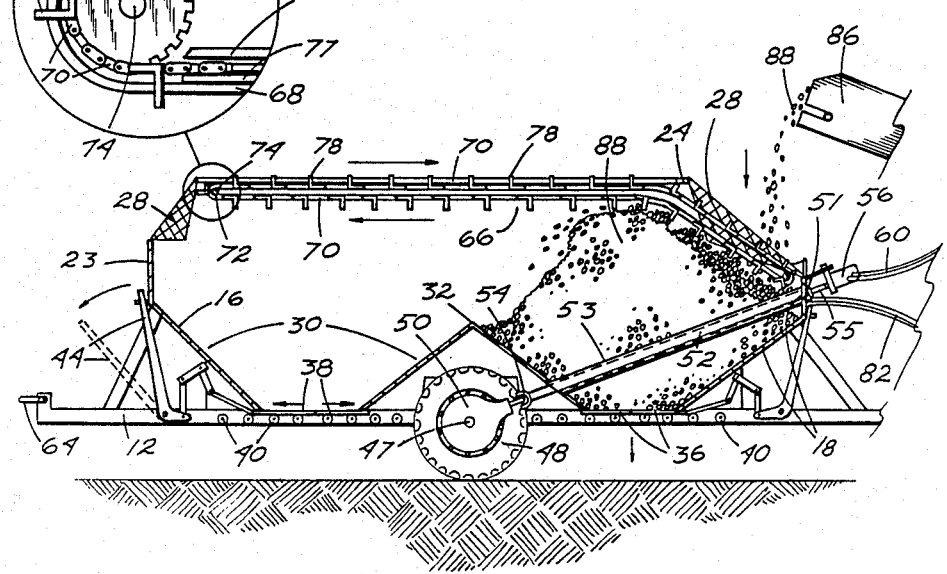
FIG. 4 is a sectional right side view of the trailer illustrating the two hoppers, the drive shaft with the differential gear attached to the wheel axle, the rotating drag chain with attached paddles during loading, and an enlargement of the upper rear corner end drag chain return sprocket.
Figure 5:
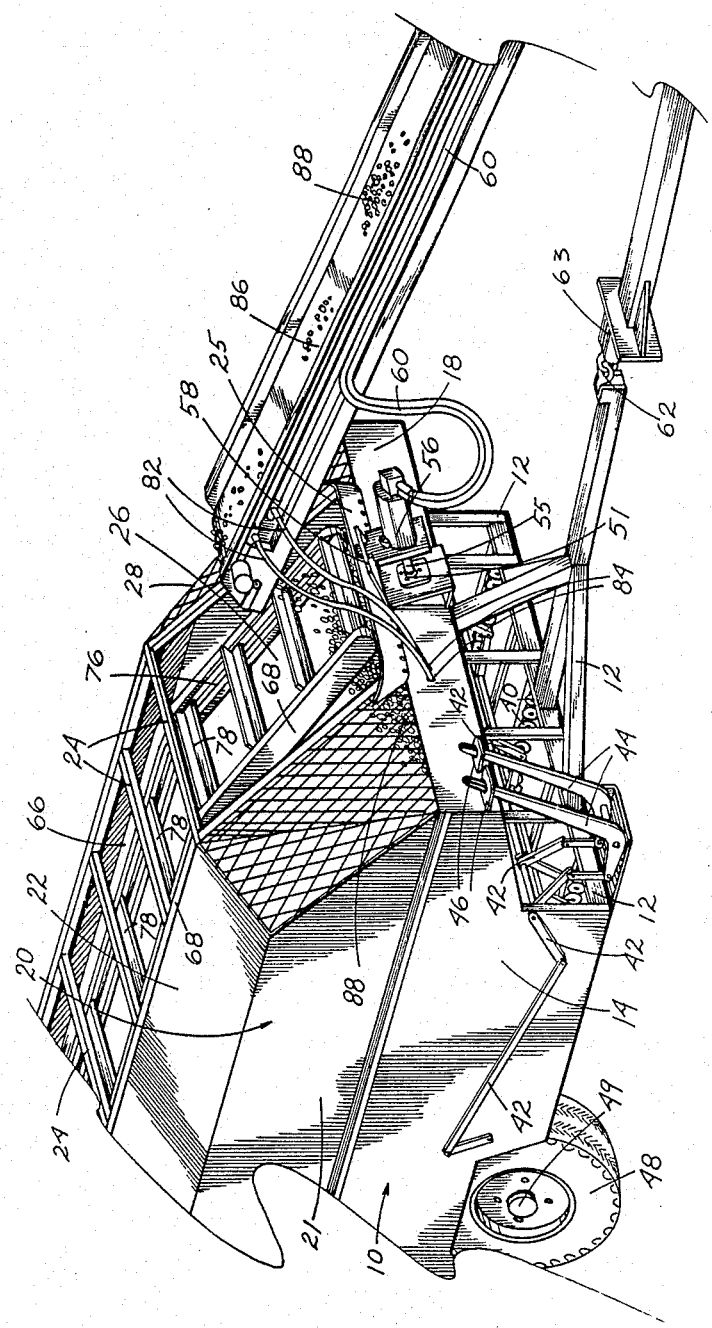
FIG. 5 is a partial perspective frontal view of the harvest trailer being loaded by the conveyor system of a nut harvesting machine.
Figure 6:
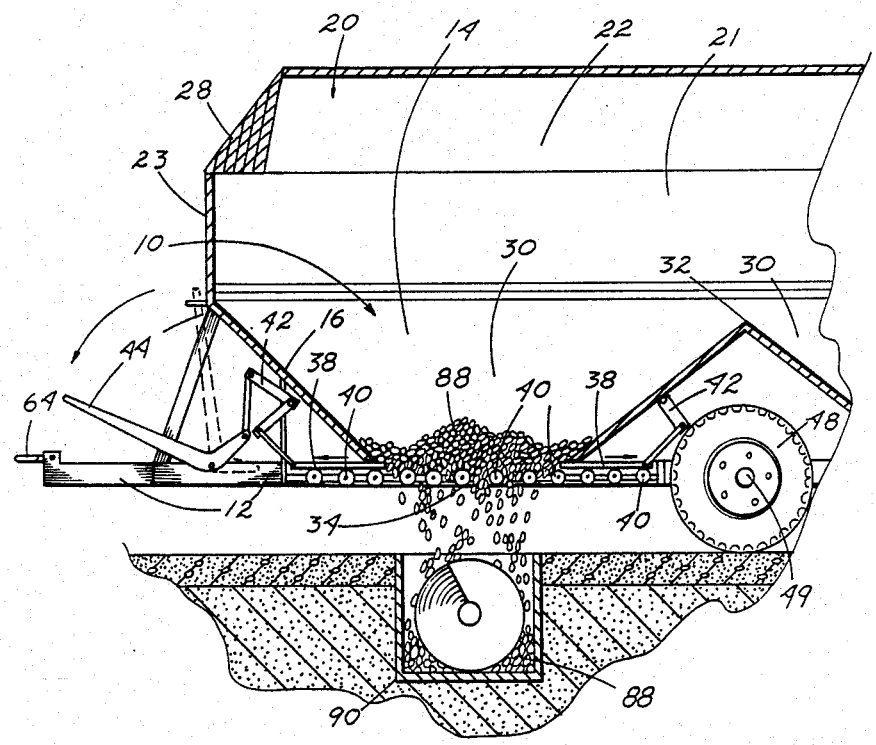
FIG. 6 is a partial right side view of the harvest trailer sectioned to illustrate the horizontally sliding bottom dump doors opened and releasing transported nuts into the standard auger pit receiving chamber of a nut processing plant.
Figure 7:
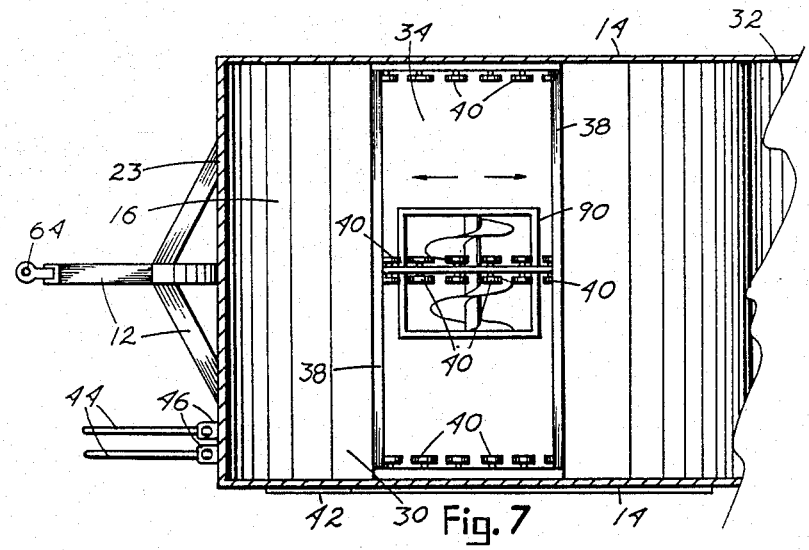
FIG. 7 is a top sectional view of the floor of the empty bulk harvest trailer illustrating the dump door wheel bearings with the slide doors in the open position.

Referring now to the drawings in general where the preferred embodiment of the invention is illustrated. The bulk harvest trailer is comprised of trailer body 10, normally fabricated of metal, mounted on a substantially rectangular trailer base frame 12, normally fabricated of metal. Trailer base frame 12 extends past trailer body 10 frontwards and rearwards terminating into front trailer tow hitch 62 at the front and rear trailer tow hitch 64 at the rear. Trailer body 10 is a substantially rectangular housing having two vertical side walls 14, an angled upwardly outwardly projecting back end panel 16 and a front end panel 18 angled upwardly projecting outwardly then terminated vertically. The top of trailer body 10 is fitted with hood 20 comprised of two hood vertical side walls 21, upwardly and inwardly angled upper hood cap panels 22, a short vertical back end panel 23, and a short front rounded end load retainer 25. The front end of hood 20 angles downward and outward over front end panel 18 of trailer body 10, having load receiving opening 26 position centrally therein, as shown in FIG. 5. Hood 20 is opened longitudinally along the top and paralleling support braces 24 crosswise retain hood 20 properly positioned and braced for substantial attachment to the upper edges of trailer body 10. The front and back end of hood 20 are affixed with expanded metal corners 28 angled upward and inward. The mesh of expanded metal corners 28 is sized to provide through viewing without allowing nuts to fall out. Trailer body 10 is substantially divided into two large funnel-like hoppers 30, best seen in FIG. 4. Front hopper 30 features an upwardly and outwardly angled end panel surface which is the reverse side of the lower outwardly angled projecting panel previously described as front end panel 18. The rear hopper 30 has an upwardly and outwardly angled end panel surface which is the reverse side of the previously described lower outwardly angled back end panel 16. The lateral sides of both hoppers 30 are side walls 14. Between the two hoppers 30, transversely positioned in trailer body 10 is an inverted V-shaped floor intrusion 32. The underside of inverted V-shaped floor intrusion 32 provides an opened throughway wheel housing for heavy duty axle 47 plus housing for differential gear 50 and wheels and tires 48. Each hopper 30 has a rectangular flat bottom section with load release openings 34 transversely positioned in the trailer between the angled end wall panels and the inverted V-shaped floor intrusion 32. Each load releasing opening 34 is covered by double sliding doors designated front sliding dump doors 36 and rear sliding dump doors 38. The doors are arranged to slide apart to open and slide together to close. Each set of doors rides on a series of bearing rollers 40 rotatably attached to trailer base frame 12 in four parallel rows underneath front sliding dump doors 36 and rear sliding dump doors 38. The rows of bearing rollers 40 run parallel to side walls 14 shown best in FIG. 7. Each door is separately manually controlled by separate control levers 44 attached to a pivotal rod and cam system to operate control links 42 positioned externally of hoppers 30 at each end of the trailer. Control links 42 for one of the two innermost doors run from the pivotal rod and cam system in the back end panel 16 along the exterior of side wall 14 of trailer body 10 and then through side wall 14 to attached to the door under inverted V-shaped floor intrusion 32 of trailer body 10 best seen in FIGS. 1 and 6. Control links 42 for the other innermost door runs along the exterior of side walls 14 of trailer body 10 from the front pivotal rod until passed through side wall 14 to attach to the door underneath. The pivotal rods are operated by control levers 44. The outermost doors at both ends of the trailer are connected to control levers 44 by short control links 42 directly under trailer body 10 over trailer base frame 12, see FIG. 5. Each of the four control levers 44 can be releasably retained in the closed position by a hasp-like control lever retainer 46 hingedly attached on the exterior of front end panel 18 and the exterior of back end panel 16. Control lever retainers 46 are structured to be flipped upward freeing control levers 44 for use and returned downwards to relock control levers 44 in place.

Figure 2:
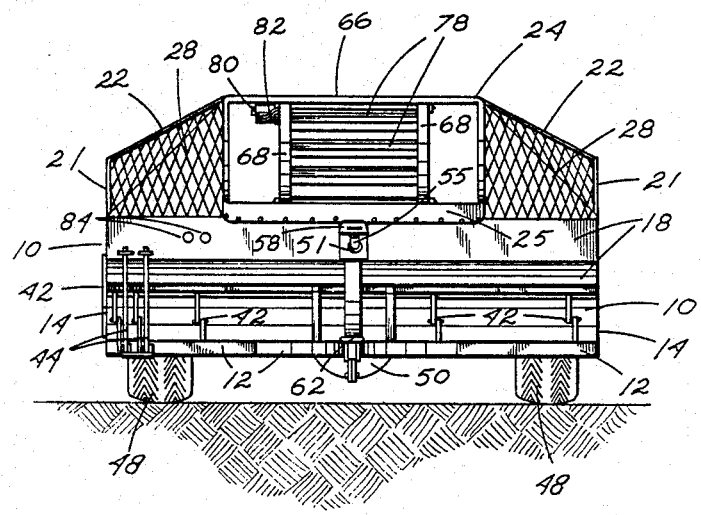
FIG. 2 is a frontal view thereof.
Figure 3:
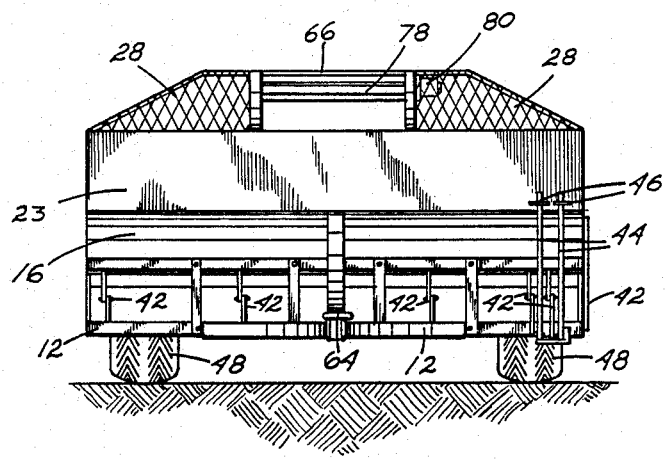
FIG. 3 is a rear view thereof.

Trailer base frame 12 is supported on a transverse heavy duty axle 47 bolted to the frame directly beneath inverted V-shaped floor intrusion 32. Heavy duty support wheels and tires 48 are attached at each end of heavy duty axle 47. The wheels are affixed to the axle with wheel hubs 49. Centrally positioned on heavy duty axle 47 between wheels and tires 48 is a heavy duty truck rear end type differential gear 50. A drive shaft 52 is affixed with U-joint 54 to differential gear 50. Drive shaft 52 extends upward at an angle through drive shaft housing 53, passing centrally through the cargo area of trailer body 10 to exit through. and extend somewhat beyond front end panel 18. At the terminal end of drive shaft housing 53, drive shaft 52 is retained by drive shaft support bearing 51. Hydraulic motor attachment shaft 55, the upper end portion of drive shaft 52, is adapted with splines cooperatively structured for removable attachment to spline fitted hydraulic drive motor 56 shown in FIGS. 2 and 4. Hydraulic motor plate 58 is an apertured rectangular hasp-like plate hingedly affixed to front end panel 18 of the trailer above hydraulic motor attachment shaft 55 designed to latch over a projection located on spline fitted hydraulic drive motor 56. Hydraulic motor plate 58 serves to removably secure spline fitted hydraulic drive motor 56 without the use of hand tools, and prevent it from rotating along with drive shaft 52. Removable spline fitted hydraulic drive motor 56 receives power from the main harvester, shown partially in FIG. 5, through hydraulic drive motor lines 60 attached to drive spline fitted hydraulic drive motor 56, best seen in FIG. 5 and further described later in the specification.

The top section of hood 20 supports drag chain load leveler 66 under and attached to support braces 24. Drag chain load leveler 66 is comprised of two separated parallel, elongated U-shaped chain channels 68 horizontally paralleling side walls 14 attached to support braces 24, best shown in FIG. 5. The front section of chain channel 68 angles downwardly at front end panel 18 approximately the same angle as expanded metal corners 28 angle into load receiving opening 26. Each parallel chain channel 68 houses a continuous section of chain 70 supported on two bearing mounted sprockets 72, one at each end of each chain channel 68. The two front and two rear sprockets 72 are fastened together by drag chain axles 74. Chain 70 is maintained in position inside chain channels 68 with the help of metal chain separator 76 and plastic chain support 77 as shown in FIG. 4. Plastic chain support 77 serves as a low frictional chain support surface to increase the lifespan of chain 70. Attached to by welding or other suitable means, and spanning interspersed between the two parallel sections of chain 70 is a plurality of angle iron drag chain paddles 78 used to distribute the pile of nuts as shown in FIG. 4. The right rear drag chain axle 74 is affixed with drag chain hydraulic motor 80 which receives pressurized hydraulic fluid for power through drag chain hydraulic motor lines 82 from the harvester. Drag chain hydraulic motor lines 82 are fitted with quick connectors at their free ends for removable insertion into cooperatively structured drag chain hydraulic line receivers 84 located on the exterior right front end panel 18 of trailer body 10. Drag chain hydraulic line receivers 84 are connected by additional hydraulic lines attached to one outward side of one chain channel 68 and extend to drag chain hydraulic motor 80 providing the power to rotates the rear drag chain axle 74. The rotation of the rear chain axle 74 causes both parallel sections of chain 70 to move and front chain axle 74 to rotate. Chain 70 runs on a continuous track. As chain 70 moves, drag chain paddles 78 also move with the lower section of the drag chain moving from front end panel 18 to back end panel 16.

In use, conveyor 86 of the harvesting machine loads the nut crop, load 88 into trailer body 10 through load receiving opening 26, as seen in FIG. 5. Front trailer tow hitch 62 is connected to rear harvester hitch 63, as shown in FIG. 5. Hydraulic drive motor lines 60 and drag chain hydraulic motor lines 82 are attached to the side of conveyor 86, shown in FIG. 5, and are connected to their specific connection sites on trailer body 10. Hydraulic drive motor lines 60 are connected with threaded fittings to spline fitted hydraulic drive motor 56 providing power to differential gear 50 to propel support wheels and tires 48, either forward or in reverse. Controlled applications of the fluid is regulated with standard fluid reversing and regulating controls at the supply source of the fluid on the harvester. The r.p.m. rate of spline fitted hydraulic drive motor 56 is governed by variations in fluid pressure applied. The propulsion applied to wheels and tires 48 of my bulk harvest trailer alleviates the harvester from providing all the necessary traction.

As conveyor 86 dispenses load 88 into load receiving opening 26, load 88 drops through rotating drag chain paddles 78 and falls into front hopper 30, shown in Fig. 5. As load 88 accumulates and reaches load receiving opening 26, the front to back rotating lower drag chain paddles 78 drags the top section of the pile and gently transfers the incoming load 88 to the rear of trailer body 10, as shown in FIG. 4, where it eventually begins to fill the rear hopper 30. The width of drag chain paddles 78 help to ensure good distribution of load 88 towards side walls 14. The harvest operator can visually observe the loading process through expanded metal corners 28 and determine when trailer body 10 is full.

When the trailer is full, spline fitted hydraulic drive motor 56 powered from the harvester is removed from hydraulic motor attachment shaft 55 and drag chain hydraulic motor lines 82 are disconnected from front end panel 18 of the trailer. A large tractor having good traction is hitched to rear trailer tow hitch 64. Front trailer tow hitch 62 is released from the harvester. The use of rear trailer tow hitch 64 solves the balancing problem and also in most cases eliminates the need for turning the bulk harvest trailer around in the narrow orchard rows. After removing the full trailer, a second empty trailer is hooked-up to the harvester allowing harvesting to continue almost uninterrupted. Once the full bulk harvest trailer has been transported to the unloading site, front sliding dump doors 36 are positioned above auger pit 90, shown in FIG. 6. Besides the auger pit 90 illustrated, many other types of load 88 receiving equipment can be used with this invention since the retracting types doors require only minimal bottom clearance. For depositing load 88 into auger pit 90 front control levers 44 are pulled to manipulate control links 42 which retract each half of front sliding dump doors 36 in opposite directions, allowing the release of load 88. The rate of release of load 88 through load release openings 34 can also be easily controlled by opening and closing the doors. With front control levers 44 pushed against the trailer ends and secured in control lever retainers 46, both halves of the front sliding dump doors 36 are closed. The trailer can then be pulled forward positioning rear sliding dump doors 38 over auger pit 90 where the back half of the trailer is unloaded. In some situations both front sliding dump doors 36 and rear sliding dump doors 38 are opened at the same time for unloading.

Although I have described my invention in detail in the specifications it is to be understood that modifications and alterations in the design of the invention may be practiced, insofar as such modifications do not exceed the intended scope of the appended claims.

What I claim as my invention is:

1. A low-profile agricultural trailer with power assisted wheels for orchard use during nut harvesting, comprising:

a trailer body substantially rectangularly configured with paneled outwardly beveled front and rear ends and paneled vertical sides, said trailer body upwardly opened with said opening partially covered by a sectional opened-top longitudinal hood, said trailer body formed internally into hopper-like structure with openable bottom closures horizontally operational in the base thereof;

means for opening and closing said openable bottom closures horizontally operational;

expanded metal see-through corners affixed at the ends of said sectional opened-top longitudinal hood;

load leveling chains mobile in a continuous loop in paralleling channels horizontally affixed adjacently below said opened top of said longitudinal hood to endwardly positioned axled sprockets arranged with controllable motoring means;

angular load leveling paddles attached interspersed transversely to said chains;

a wheel housing positioned downwardly and opened transversely centrally through said trailer body, said wheel housing having an inverted V-shaped cover with said inverted V-shaped cover being angled inside walling providing, with said beveled front and rear ends and said vertical sides, said forming of said hopper-like structure in said trailer body;

a base framework supporting said trailer body;

trailer tow hitches affixed to said base framework, one at each end of said trailer body;

at least one axle affixed to said base framework and passing through said wheel housing;

at least two automotive type wheels, one attached to each end of said axle;

road tires mounted to said automotive type wheels;

a wheel hub for attaching said automotive type wheels to said axle;

a differential gear operationally affixed to said axle;

an accessible housed drive shaft operationally affixed to said differential gear;

a reversible motoring means applicable to said accessible housed drive shaft with sufficient torque to rotate said axle via said affixed differential gear and turn said wheels and adequately powered to move said agriculture trailer bi-directionally with said trailer fully loaded;

connective means for directing a motivating force to said controlling motoring means and said reversible motoring means on said trailer from a fluid supply and pressurizing source on a towing vehicle.

2. The invention according to claim 1 wherein said openable bottom closures horizontally operational in the base of said trailer body comprise bearing roller supported oppositely positioned substantially rectangular double sliding doors arranged longitudinally transversely to said trailer body in said base thereof.

3. The invention according to claim 1 wherein said means for opening and closing said openable bottom closures horizontally operational are control levers at each end of said trailer body linked to said openable bottom closures and levered for manual manipulation to open and close said openable bottom closures.

4. The invention according to claim 1 wherein said controllable motoring means for said chains is a hydraulic motor with the r.p.m. rate controlled by variations in fluid pressure applied to said motor and directional rotation controlled according to course changes of said fluid as applied to said motor with applications of said fluid regulated at said fluid supply source on said towing vehicle.

5. The invention according to claim 1 wherein said reversible motoring means applicable to said accessible housed drive shaft with sufficient torque to rotate said axle via said affixed differential gear and turn said wheels adequately powered to move said agriculture trailer bi-directionally with said trailer fully loaded is an attachable and detachable hydraulic motor with the r.p.m. rate controlled by variations in fluid pressure applied to said motor and directional rotation controlled according to course changes of said fluid as applied to said motor with applications of said fluid regulated at said supply and control source of said fluid on said towing vehicle.

6. The invention according to claim 1 wherein said connective means for directing a motivating force to controlling motoring means and said reversible motoring means on said trailer from a fluid supply and pressurizing source on a towing vehicle includes hydraulic hoses.

* * * * *